Jan. 27, 1959     G. T. RANDOL     2,870,642
AUTOMOTIVE VARIABLE-RATIO POWER TRANSMISSION
Filed July 27, 1955     3 Sheets-Sheet 1
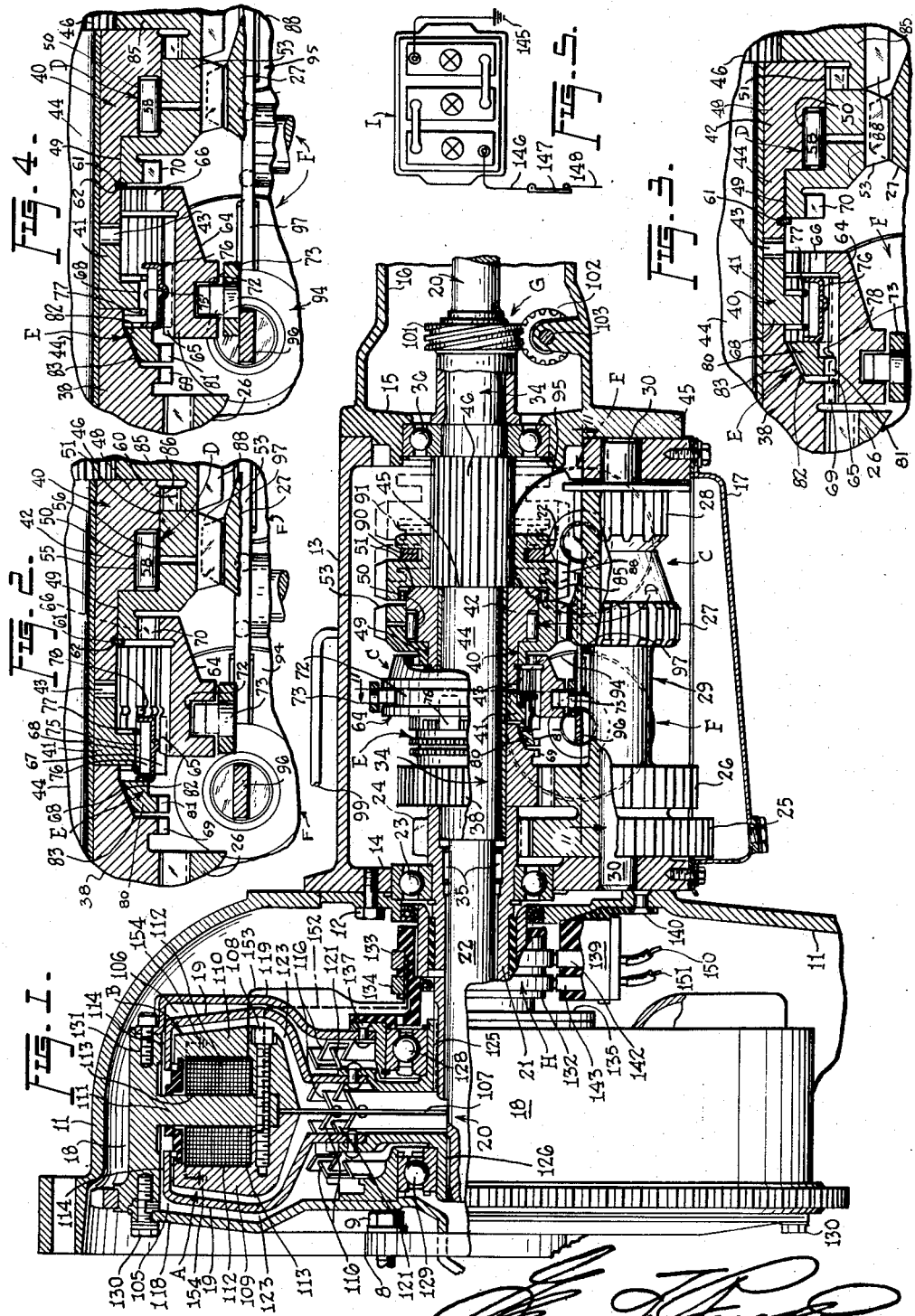
Inventor

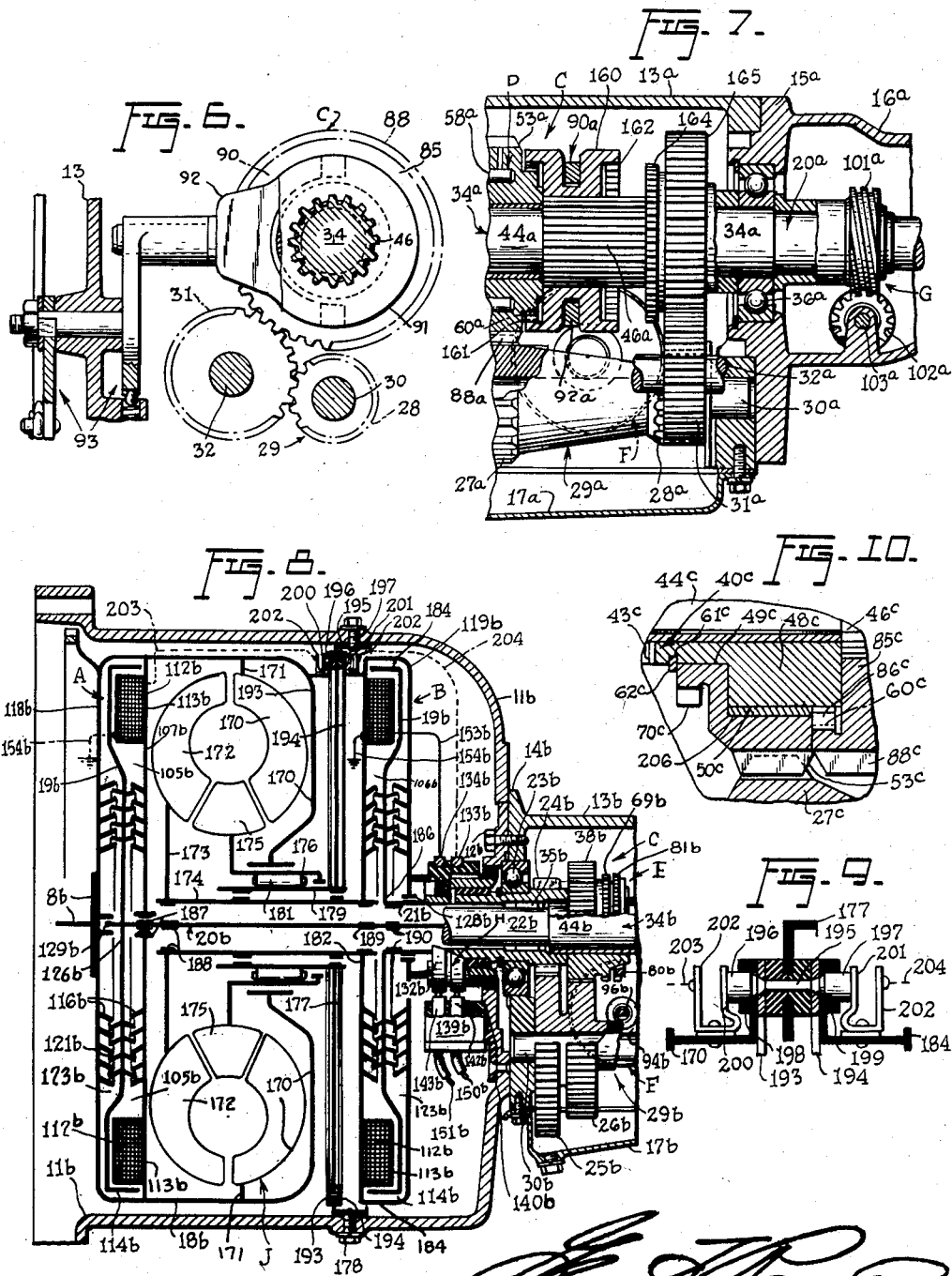

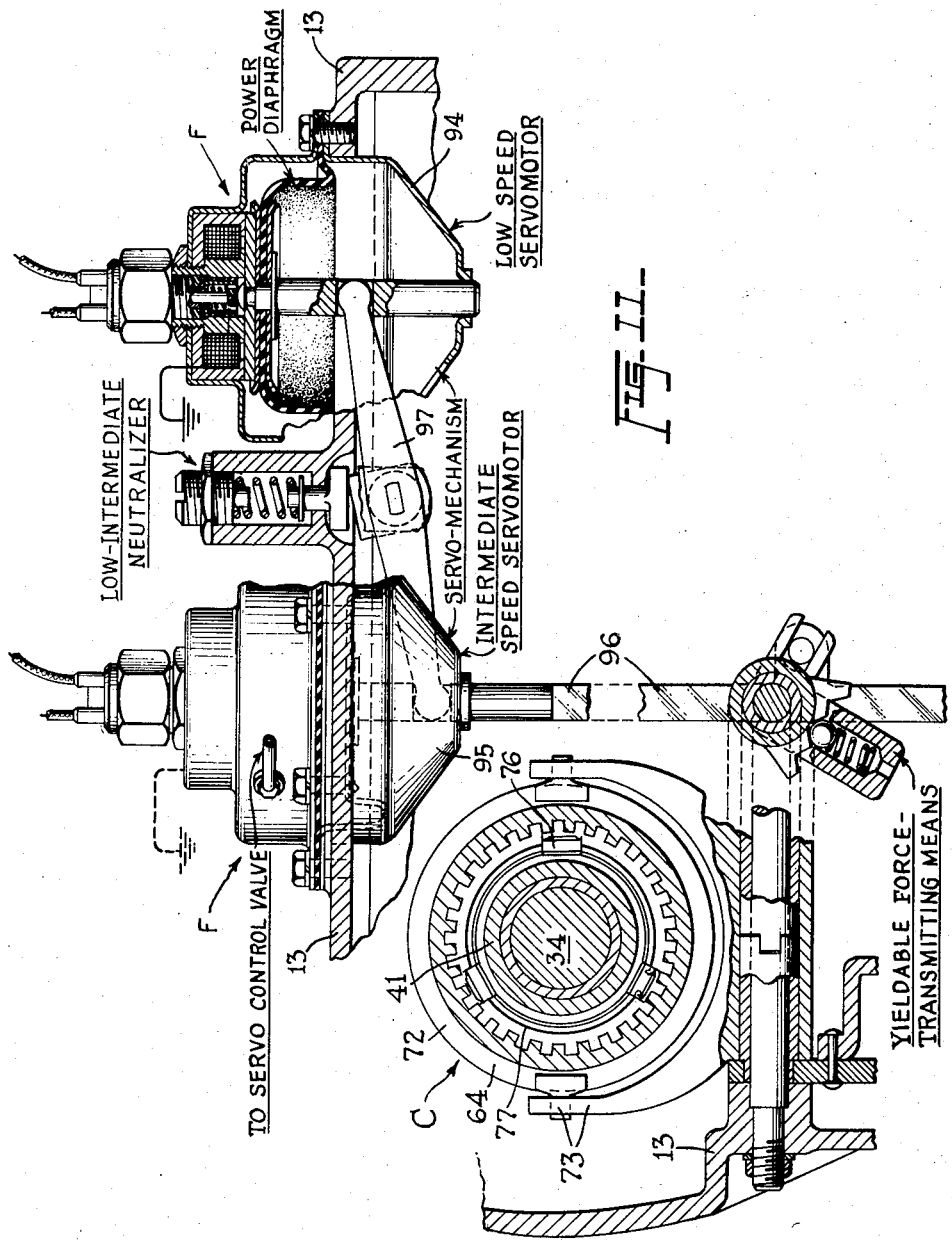

United States Patent Office 2,870,642
Patented Jan. 27, 1959

2,870,642

AUTOMOTIVE VARIABLE-RATIO POWER TRANSMISSION

Glenn T. Randol, Mountain Lake Park, Md.

Application July 27, 1955, Serial No. 524,677

35 Claims. (Cl. 74—330)

My invention relates to power transmissions for automotive vehicles and the like, and more particularly to novel drive mechanism having dual input shafts coaxially disposed for transmitting torque via a single output shaft to the driving wheels of the vehicle, said shafts being selectively connectable in variant relative driving speed relation to produce three forward driving speeds and a reverse drive.

More specifically, the present invention includes dual master clutches operably incorporated in a novel manner between the vehicle engine and shaft connections aforesaid for driving the two input shafts, and so arranged that one clutch is operatively connected directly to the output shaft via one of the input shafts and thus designated the direct-drive clutch, and the other clutch is connected indirectly to the output shaft via the other input shaft and selective connections aforesaid to provide the underdrive speeds.

An object particularly relating to the object immediately preceding is to utilize in a novel manner, master clutch mechanism of the magnetic iron-powder type, said clutch mechanism being operative to instantly effect release and application of torque from the engine to said input shafts, or which may be caused to gradually energize to full lockup condition for smoothly starting the vehicle as by depressing the accelerator pedal.

A further important object of my invention is to provide an improved automatic transmission of the type under consideration in which the drive mechanism includes gearing in series with the underdrive master clutch to provide two-speeds forward and a reverse drive, and when combined with the direct master clutch giving three different forward speed drives. It is a further object to provide such gearing which is durable, compact, easily controlled, and is simple in nature. It is contemplated that preferably this gearing shall be of the synchro-mesh slidable type rather than the more complicated and costly planetary arrangements, which latter types contribute appreciably to power loss in their operation.

Another important object of my invention is to provide an improved automatic drive of the type herein considered which includes gearing in series with one of the master clutches and a hydrodynamic torque-converter or coupling unit to provide the underdrive forward speeds including reverse, and when combined with the direct-drive master clutch giving three different forward speed drives, said clutches and gearing being selectively operable responsive to suitable controlling components and characteristics, such as, accelerator pedal position, manual selections, and vehicular speed.

A further and important object of my invention is to provide improved synchro-mesh slidable gearing adapted to provide two forward speed drives and a reverse drive, said drives being of the two-directional type controllable by an element manually shiftable to three selective positions; namely, drive, neutral, and reverse positions, said forward drives comprising gear trains in constantly meshing relation and having a positive double-clutch element associated therewith for selectively establishing said power trains upon the manual element being shifted to drive position. The gearing also includes novel adaptation of overrunning clutch means in the lower drive gear train whereby synchronism of its gear set to facilitate engagement of a positive type clutch in coaxial operating relationship therewith is provided by said clutch means momentarily operating as a one-way drive immediately prior to the lock-up of the positive clutch to complete establishment of a two-way drive through the lower gear train.

An object related to the object immediately above is the provision of novel synchronizing means operable to enable the positive double-clutch element to efficiently and smoothly engage and disengage to produce the two underdrive forward speeds in either up or downshifting sequence, upshifting operation being effected by sequentially declutching the underdrive master clutch and clutching the direct drive master clutch momentarily for the synchronizing means to function during application of a shift-actuating force on said double-clutch element which, when engaged, the underdrive master clutch is reclutched to establish positive drive in the higher speed; while automatic downshifting is provided by momentary operation of said overrunning clutch in one-way driving relation induced by declutching the direct master clutch and reclutching the underdrive master clutch whereupon synchronized engagement of the double-clutch element is effective to establish positive drive in the lower speed.

The present invention contemplates that the upshifting operations respond automatically to accelerator position and vehicular speed, and the downshifting operations being forced at will or automatically produced according to the operating characteristics aforesaid.

More specifically, the present invention provides novel synchro-mesh drive mechanism having enmeshing gear sets controlled by a pair of slidable clutch elements, including said dual master clutches and the overrunning clutch means, one of said elements being shiftable by power-shifting mechanism, and the other by manually-operable selector mechanism, and wherein upshifting of said power-shifted element is responsive to operative energization thereof to cause one of said master clutches to be released and the other master clutch engaged momentarily followed by release of the latter clutch and reclutching of the former upon completion of shifting said element into engaged condition, while downshifting of said element is responsive to operation of said power-shifting mechanism to release the other clutch and re-engage the one clutch causing said overrunning clutch to be operative as a one-way drive momentarily whereupon said element is synchronized to engage with its cooperating clutch element thereby establishing the gearing in a lower speed drive.

A primary objective of the present invention, therefore, is to provide automatic up and downshifting of a positive drive synchro-mesh transmission having two forward speeds and a reverse speed, said shifting being accomplished during open throttle operation of the engine, if desired, and responsive to a governor driven proportionally to vehicular speed and the actuation of the engine controlling accelerator mechanism.

To achieve this latter objective, the invention provides novel mechanical drive mechanism having an output driven shaft, two coaxially disposed driving input shafts, separate clutches connecting the engine with said input shafts, slidable gear-clutch element splined on said driven shaft operable by a manually movable lever, a sleeve element rotatably mounted on the driven shaft, a gear rotatably carried by said sleeve and operably incorporating an overrunning clutch therebetween, a countershaft driven from one of said input shafts, a gear fast on the countershaft meshing with the gear carried on the sleeve, another gear fast on the countershaft meshing with a gear rotatably carried on the driven shaft, an external annular hub formed on the sleeve element for said overrunning clutch means and connectable to said driven shaft by said first-named clutch element, a positive double-clutch element slidably splined on said sleeve element, complemental clutch means carried by the two rotatable gears on the driven shaft for selective engagement with the double-clutch element, and a reverse idler gear driven from a gear fast on the countershaft for engagment by the first-named clutch element.

A further more specific object of the present invention is to produce a novel automatic drive for automotive vehicles which utilizes pneumatically-operated servo-mechanism for actuating the drive components to change the effective drive thereof, and which incorporates the servo-mechanism with its controlling system comprising the control devices and associated mechanical and fluid interconnections, etc., as a unitary assembly with the drive housing thereby providing a self-contained drive unit eliminating all external actuating components, devices, etc., together with their conduit and mechanical connections heretofore proven objectionable from an appearance standpoint, and operationally inefficient and more costly and difficult to install and maintain.

An object related to the object immediately preceding is to provide novel dual servo units each having a flexible diaphragm movable in one direction by spring action, one of which units is adapted to actuate a unitary positive clutch element of the gearing to a predetermined position to produce low speed forward drive, and the other unit is adapted to actuate said clutch element to a different position to establish intermediate speed forward drive, said clutch element having a neutral position common to the aforesaid drive positions induced by spring action of the servo units.

Another object related to the two objects next above is to utilize vacuum produced within the intake-manifold during operation of the internal-combustion vehicle engine for causing differential pressure to be effective across the movable diaphragm to operate the same in opposition to the spring action aforesaid.

The invention consists of the novel constructions, arrangements and devices to be hereinafter described and claimed for carrying out the foregoing general statement of the nature of my invention, and such other objectives, features, and advantages as will appear in lieu of presenting them categorically in the above statement, from the following detailed description considered in conjunction with certain preferred embodiments illustrated in the accompanying drawings, wherein:

Figure 1 is a longitudinal section of a power transmission embodying the principles of the invention with the parts in low speed operating positions;

Figure 2 is a fragmentary sectional portion of Figure 1 on an enlarged scale showing more clearly the parts in low speed drive operating positions;

Figure 3 is a view similar to Figure 2 but showing the parts operated to establish intermediate speed drive;

Figure 4 is another view similar to Figures 2 and 3 but showing the parts in operated positions corresponding to direct-drive or neutral;

Figure 5 diagrammatically illustrates a source of electrical energy as a conventional storage battery to which is connected a portion of the electrical control circuit in which is interposed a master control switch;

Figure 6 is a transverse view partly in section of the reverse drive gearset;

Figure 7 is a longitudinal view partly in section of a modified reverse drive gearset in which the gears are constantly meshed;

Figure 8 is a partially schematic longitudinal view of a modified form of the invention in which a hydrodynamic torque-converter or coupling unit is incorporated in the drive line between the engine and the underdrive magnetic clutch;

Figure 9 is a fragmentary view on an enlarged scale of a portion of Figure 8 modification showing details of the contact assembly for completing the circuit between the field coil of the magnetic clutch adjacent the engine and its rotating collector ring;

Figure 10 illustrates a modified low speed gear set in which the overrunning clutch is eliminated from between the low gear and composite drive sleeve; and Figure 11 is a fragmentary view of Figure 1 taken along the lines 11—11—11 thereof looking in the direction of the arrows, and showing in longitudinal section on an enlarged scale, details of the servo-mechanism for controlling the low and intermediate speed operations with other related portions depicted in transverse section 90° to normal.

Referring now to the drawings wherein a preferred embodiment of my novel automatic power train or drive unit is illustrated in Figures 1, 2, 3, and 4, and which comprises an annular flange 8 of a shaft, such as a crankshaft from an engine (not shown), connected as by bolts 9 to dual magnetic iron-powder clutches indicated generally at "A" and "B" contained in a forwardly extending bell-shaped housing 11 to which is attached, as by cap bolts 12, a rearwardly projecting housing 13 having front and rear end walls 14 and 15 respectively, a hollow extension 16 forwardly flanged for connection to the rear wall, and a removable cover 17 for the bottom opening formed to provide a reservoir with a drain plug for the transmission lubricant.

Each of the magnetic clutches includes a driving member or drum 18 connected to the flange and a driven member 19. Drive from the clutch driven members is transmitted by means of a pair of coaxially disposed input drive shafts 20 and 21, respectively, with shaft 21 formed as a sleeve to encircle the forward reduced portion 22 of shaft 20. The two input shafts drivingly project through the front end wall of the gear box housing 13 which contains transmission drive mechanism generally indicated at "C" of the sliding gear type for establishing two forward speed drives and a reverse speed drive. The tubular drive shaft 21 is mounted for rotation in the transmission housing 13 by means of bearings 23 carried in the front end wall 14. A gear 24 is formed on the flanged end of the encircling drive shaft 21, the gear 24 being engaged with a gear 25 for constant drive therebetween. Gears 25, 26, 27, and 28 are adapted to form a gear-cluster 29 rotatably mounted on a countershaft 30 which is supported at each end in the end walls of the transmission housing 13. Gear 28 is drivingly connected at all times with an idler gear 31 (see Figure 6) which rotates on its own shaft 32 which in turn, is supported by the rear end wall 15 as is understood.

The drive shaft 20 possesses both input and output drive characteristics, accordingly, the portion 22 of the input shaft 20 associated with the driven member 19 of the magnetic clutch A will, in the course, of the description to follow, be termed the "input" or "driving" shaft, and the portion 34 of this shaft associated with the transmission drive mechanism C will be termed an "output" or "driven" shaft, while this latter shaft including the portion connected to the driven member may be referred to as an "input" or "driving" shaft for flexibility in terminology. This output shaft portion 34 is medially piloted as at 35 in the flanged end of the encircling drive sleeve 21. The rear end of the output shaft is mounted for rotation in bearings 36 which are carried by rear end wall 15 of the transmission housing 13. The two input shafts 20 and 21, countershaft 29 and idler gear shaft 32 are disposed in parallel relation with respect to each other as best demonstrated in Figure 1. As viewed in the drawing, a gear 38 is rotatably mounted on the driven shaft portion 34 in abutting adjacency to the gear 24 and adapted to constantly mesh with countershaft gear 26 to form intermediate speed gear set train, a composite drive sleeve 40 having a front section 41 and a rear section 42 interlocked as at 43 for rotation together, is rotatably mounted on an enlarged diameter sleeved portion 44 of the driven shaft 34 with the outer end of the rear section 42 in abutting engagement with an annular shoulder 45 formed at the point of mergence with the portion 44 and a larger splined portion 46. The rear section 42 has an end flange 48 having three annular lands 49, 50, and 51 of increasing diameters in that order. A gear 53 is rotatably mounted on the flange 48 in constant meshing relation with the countershaft gear 27 to form low speed gear set train. Operably incorporated between suitable radially confronting surfaces 55 and 56 on the medial land 50 and gear 53, respectively, are a series of circumferentially spaced sets of graduated roller elements 58, the two surfaces aforesaid and roller elements being so arranged as to produce an over-running clutch means generally designated "D" which act as a synchronizing means by momentary establishment of a one-way drive through the low speed gear set to facilitate establishment of a two-way drive therethrough. External clutch teeth 60 are formed on the end land 51 adjacent the gear 53. An annular external grooved 61 is provided in the surface of the rear sleeve section for the reception of a split retaining ring 62 to maintain the rear sleeve section and gear 53 operatively assembled.

A double-clutch collar or element 64 having internal clutch teeth 65 and 66 is slidably splined as at 67 to an external flanged portion 68 integral with and forming the forward end of the front sleeve section 41. External clutch teeth 69 and 70 are provided on the gears 38 and 53, respectively, in confronting relationship, for engagement by the clutch teeth 65 and 66, respectively, to thus selectively connect gears 38 and 53 to the composite sleeve 40. An external annular groove 72 is provided in the double clutch element 64 for reception of a shift fork or yoke 73 whereby said member is slidably actuated to its different operating positions. As best shown in Figures 2, 3, and 4, the clutch collar 64 is shiftable to three different operating positions to establish low speed drive, intermediate speed drive, and neutral which latter position disables these two speed drives aforesaid while direct-drive is established. The preferred operation of the double clutch 64 is that it be power-shifted.

Conventional friction-type synchronizer means generally designated "E" is operably associated with the positive clutch teeth 69 and 70, said synchronizer means comprising a plurality of circumferentially spaced openings 75 in the outer surface of the flange 68, complemental yieldable detent elements 76 movably positioned in said openings and having outward radial spring action as by spring loops 77, cooperating recesses 78 medially disposed transversely in the clutch teeth 65, a movable friction cone 80 having external clutch teeth 81 and an internal conical surface 82 adapted to be brought into frictional engagement with a complemental surface 83 on the gear 38, said frictional engagement of the cones being induced by initial sliding movement of the double-clutch collar 64 acting through the detents engaged with their respective recesses aforesaid, to quickly adjust the relative speeds of the clutch collar 64 and gear 38 to substantially synchronous speed thereby facilitating engagement of the positive clutch teeth aforesaid to establish intermediate speed drive in a manner well known in the transmission art.

The splined portion 46 of the driven shaft 34 is adapted to receive a gear-clutch collar or element 85 for sliding movement relative thereto, said collar 85 being provided with internal clutch teeth 86 for engaging the complemental clutch teeth 60 to connect the composite drive sleeve 40 to the driven shaft 20 whereby low speed and intermediate speed drives are conditioned for selective automatic operation to be hereinafter elaborated on. The periphery of the collar 85 is provided with gear teeth 88 adapted to engage the teeth of the idler gear 31 to thus produce reverse drive. An annular groove 90 is provided between the rear side of collar 85 and an integral annular flange 91 for the reception of a shift fork or yoke 92 for shifting said gear-clutch collar 85 to its three different operating positions; namely, "Drive," "Neutral," and "Reverse." In practice, the present invention contemplates that the gear-clutch collar would be manually-operated as by a shift or selector lever (not shown) mounted for convenience subjacent to the vehicle steering wheel, said lever having associated therewith a suitable dial or indicating means (not shown) to facilitate the lever settings and interconnecting linkage generally illustrated in part at 93 (see Figure 6) with the shift fork 92 as is understood.

As previously stated, the double clutch collar 64 is adaptable for automatically controlled shifting as by fluid pressure-operated servo-mechanism generally indicated at "F" in Figure 1 with the structural details illustrated in Figure 11, said servo-mechanism comprising a pair of servomotors 94 and 95 for controlling low and intermediate power trains, each of these servomotors is provided with a movable power member such as, for example, a flexible diaphragm having spring action in one direction, and suitable interconnecting linkage or operative connections depicted in part at 96 and 97 with the shift fork 73 to enable said servomotors, when energized, to slidably actuate the collar 64 to its different operating positions aforesaid. Such automatic control including a conduit as at 99 for conveying the fluid actuating medium from its source to the servo-control valving (not shown), and a governor device and the speedometer (not shown) having a common drive as at "G," said drive comprising a worm gear 101 fast on the driven shaft 20, a constant meshing gear 102 fast on a shaft 103 supported transversely in the transmission housing extension 16, said latter shaft having connections at each end to the governor shaft and speedometer drive cable to operate the governor device and the speedometer at speeds proportional to vehicular speeds in a well known manner.

Further considering the construction of the magnetic clutches A and B, only one of these clutches will be described in detail since each is substantially a counterpart of the other. This particular type of master dual-clutch arrangement is used herein for illustrative purposes only, and in no manner is to be construed as restricting or limiting in the patent sense, since the present invention also contemplates use of dual friction clutches and particularly quick-acting clutches responsive to fluid and/or spring force to effect controlled or quick engagement necessary for smooth starting of the vehicle and rapid speed changes in the drive unit, respectively, while the vehicle is in motion. The driving member or drum 18 is divided into two chambers 105 and 106 by a partition member 107 having a central circular opening. This partition is secured at its periphery, as by a plurality of cap bolts 108, between a pair of driving members or rotating electromagnets 109 and 110, said members being fixed to the drum on opposite sides of a medially disposed internal annular flange 111 integral with the drum, said cap bolts extending through the member 110, flange 111 into threaded connection with the member 109 whereby the drum and members are secured in unitary assembly with the periphery of partition member 107 clamped between said members. Each of the driving members has an annular offset portion spaced from its confronting side on the flange, said space being so arranged as to accommodate an annular field coil 112 within a steel housing 113. A fixed air gap 114 is provided between each side of the driven members 19 and their respective driving members 109 and 110 which carry the field coil units. This gap is closable by fluid magnetic material electromagnetically energizable to smoothly link the driving and driven members 18, 19 together as the power transmitting medium therebetween. The chambers 105 and 106 contain a suitable quantity of fluid magnetic material such as, for example, magnetizable powder mixed with a dry lubricant. Iron makes up two-thirds the powder's volume and slightly more than 90 percent of its weight. Total volume and weight of the mixture are 75 cc. and 11 oz., respectively. A series of angulated baffles 116 of circular configuration are secured to both sides of the partition 107 in radially spaced relation and the inner sides of the drum ends 118 and 119. Another series of similar baffles 121 are attached to both sides of each of the driven members 19 with the outer edges of said baffles in overlapping relation with respect to each other to form a series of labyrinths of annular configuration therebetween, said outer edges projecting outwardly radially thus preventing the iron powder from inward displacement toward critical operating parts and bearing surfaces. Reservoirs 123 are formed on the sides of the drum with the driven members into which the iron powder is thrown by centrifugal force while the engine is running and no current being fed to the field coil which when energized sets up a magnetic flux in the driven member 19, and also magnetizes the iron powder and driving member or drum 19, which in turn causes the magnetic powder to be drawn into the air gap 114 where it is "solidified" in direct proportion to the magnetizing current applied, to thus cause the entire assembly of either clutch A or B to lock-up as a unit. Approximately 18 watts are necessary under average driving conditions for complete lock-up; less than that, would enable the clutch to "slip." Magnetic clutches constructed as above described and illustrated herein are being currently developed for automotive vehicles by at least one automotive parts manufacturer known to applicant, operating under a patent license from the owner of the patents and/or applications relating to this novel clutch development. The present invention excludes all novelty with respect to the dual magnetic clutches per se as applicant's invention. The driven member 19 of clutch B is splined at 125 to the forward end of the drive sleeve 21 and supported on the drum end 119 by bearings 128, and the driven member 19 of the clutch A is splined at 126 to the forward end of the input drive shaft 20, said latter driven member being supported on the drum end 118 adjacent the engine by bearings 129, the drum ends 118 and 119 being secured to the cylindrical shell 110 by a plurality of cap bolts 130 and 131, respectively.

A collector ring assembly is generally indicated at "H." This assembly comprises a tubular member 132 composed of insulative material such as hard rubber or fiber in which is embedded two longitudinally spaced annular conductive contacts 133 and 134, the member 132 terminates at one end into an annular flange 135 which in turn is secured as by rivets 137 to the rear end 119 of the drum 18 for rotation therewith, the tubular member is disposed in close encircling relationship to the tubular drive sleeve 21 for low rotational velocities. A fixed insulative casing 139 is attached as by rivets 140 to the inside of the rear end wall of the clutch housing 11, closely subjacent to the rotating collector rings aforesaid. A pair of movable conductive brushes 142 and 143 are incorporated in the casing for engaging their respective collector rings 133 and 134, said brushes having spring action to maintain their engagement with the collector rings.

An electrical control circuit is depicted in part (see Figures 1 and 5) for energizing the magnetic clutches A and B and to operate other control means (not shown) associated with the servo-mechanism F depicted in Figure 11. This control circuit comprises a storage battery "I" as a source of electrical energy having one terminal grounded at 145, and the other terminal connected by a conductor 146 via a master control switch 147 which can be the engine ignition switch, to a conductor 148 having branches to the various electrical devices (not shown) to be controlled, said branches including conductors 150 and 151 leading via the collector ring assembly H and conductors 152 and 153 to the field coils 112 which are grounded at 154 to control energization of the magnetic clutches A and B.

OPERATION

The operation of my novel automatic drive unit will now be described. Driving torque will in all speed ratio drives be supplied from a source of power such as an internal-combustion engine (not shown) to shaft 8 whence it will pass to the driving drum or member 18 and from there via the electromagnetically solidified magnetic material in the air gaps 114 to the driven member 19 of magnetic clutch A or B which are connected to the drive shaft 20 and the tubular drive sleeve 21, respectively. When the clutch A is energized to lock the drum and its driven member together, the driven member will transmit the drive torque or power to drive shaft 20 to which it is drivingly secured, and when the clutch B is energized to lock the drum and its driven member together, said driven member will transmit drive torque or power to drive sleeve 21 to which it is drivingly secured.

Assuming for purposes of description that the vehicle is motionless and that the gear-clutch collar 85 has been manually-shifted to connect its clutch teeth 86 with the clutch teeth 60 on the composite drive sleeve 40 to lock the latter to the driven shaft portion 46 and thereby condition for automatic operation low speed and intermediate speed drives, and that double-clutch collar 64 has been power-shifted to engage its clutch teeth 66 with the low speed gear clutch teeth 70 thereby connecting the low speed gear 53 to the compositive sleeve 40 to establish drive through the low speed power train when the magnetic clutch B is energized, all as shown in Figures 1, and 2 and 11. If the operator of the vehicle desires to travel in a forward direction, initial depression of the accelerator pedal (not shown) cause gradual energization of the magnetic clutch B to smoothly place the vehicle in motion in low speed drive through the following power train: shaft 8 to magnetic clutch B, input drive sleeve 21, gears 24 and 25, gears 27 and 53, clutch collar 64, composite sleeve 40, clutch collar 85 to the output shaft 46 which is connected to the load or driving wheels of the vehicle in a well known manner.

When the governor (not shown) is actuated to intermediate speed drive position (automatically determined by car speed and accelerator pedal position), electric current is fed to the magnetic clutch A and then interrupted to the magnetic clutch B so that there is a continuous, uninterrupted torque flow since clutch A provides a direct-drive through the transmission drive mechanism C. The clutch A then pulls the engine speed down until its speed synchronizes with the intermediate speed power train which also is being simultaneously synchronized by the synchronizer means E induced by the energized power-shifter mechanism F to facilitate engagement of the double-clutch collar 64 with the clutch teeth 69 on the gear 38. As soon as synchronous speed is reached, the double-clutch collar 64 which has already disengaged from the low gear 53 for this gear to overrun idly in meshing relation with its mating countershaft gear 26, will engage the clutch teeth aforesaid on the gear 38 to thereby establish intermediate speed drive. Instantly the magnetic clutch A is de-energized and the magnetic clutch B re-energized to drive the vehicle in intermediate speed drive through the following power train illustrated in Figure 3: shaft 8 to magnetic clutch B, input drive sleeve 21, gears 24 and 25, gears 26 and 38, double-clutch collar 64, composite drive sleeve 40, collar 85 to the output shaft 46 which is connected to the load or driving wheels of the vehicles in the conventional manner.

After proper speed conditions are met to satisfy the governor and accelerator pedal position in the intermediate speed drive, the magnetic clutch B is de-energized accompanied by power-disengagement of the double-clutch collar 64 to assume its neutral position with respect to gears 38 and 53 best demonstrated in Figure 4, and magnetic clutch A energized to establish direct-drive through the drive shaft 20 to the load or driving wheels of the vehicle as is understood.

Although my novel automatic drive may be adapted for automatically shifting clutch collar 85 from engagement with clutch teeth 60 into neutral position, and the gear teeth thereof into engagement with the idler gear teeth for establishing reverse drive power train, it is preferably manually shifted by any suitable means such as the shift yoke or fork 92 engaged in channel 90 of the clutch collar as shown in Figure 6. During such shifting operations, a synchronizing effect is produced between the squared parallel ends of the positive clutch teeth 86 and 60 in abutting relation induced by novel force-transmitting means of limited yieldable character (see Figure 11) acted on by operator force on the shift lever, whereby smooth and noiseless engagement is effected in conjunction with controlled energization of the magnetic clutches A and B. Similarly, the clutch teeth 66 carried by the double-clutch collar 64 and their complemental clutch teeth 70 carried by the low speed gear 53, to facilitate their easy engagement, are temporarily made more difficult to engage through the use of smooth, parallel abutting ends having sharp corners with properly restricted engaging and disengaging pressures required. In this manner, the double-clutch collar 64 can be shifted silently and without shock, either manually or by power means at any accelerator position, under any conditions of vehicle speed and load by enabling proper synchronization of the relatively rotating collars 64 or 85 with respect to their associated clutch teeth engageable thereby in cooperation with lapped and/or selective energization of the magnetic clutches A and B. The parallel tooth ends of the shiftable collars and associated gears are brought into engagement by a shifting force whose magnitude bears a proper relationship to the sizes of the parts and the area of the tooth ends. In practice the smooth tooth ends rub on each other as a result of a shift-inducing force applied to the shiftable collar and remain out of meshing engagement until their speeds are synchronized substantially. At the moment of substantial synchronism they mesh without shock whereupon the selected magnetic clutch is re-energized to establish drive in the selected power train. In the case of establishing low speed drive, the frictional engagement of the squared tooth ends of clutch teeth 66 and 70 would be supplemented by momentary one-way drive through the overrunning clutch means D, and upon substantial synchronism between the teeth aforesaid, the clutch collar 64 would effect meshing engagement between the teeth to establish a two-drive through the low speed gear train smoothly and without shock.

Positive neutralization of the two-speeds forward drive mechanism C is provided by the novel arrangement of the double-clutch collar 64 slidably splined on the composite drive sleeve 40. This collar is shiftable to a neutral position as shown in Figure 4 wherein the low and intermediate drive gearsets are disengaged from the drive sleeve which in turn is disconnected from the driven output shaft 20 by shifting rightward as viewed in Figure 1 the collar 85 to its first dashed line position thus insuring complete mechanical disconnection of the drive mechanism C from the output shaft 46. Even though the clutch collar 64 fails to return to its neutral position of Figure 4 due to torque bind thereon or for other temporary reasons attributable in part or wholly to the servomechanism F, disengagement of the composite drive sleeve 40 from the driven output shaft 20 as aforesaid completely interrupts torque transmission through the gearing drive mechanism C.

The illustrated automatic drive unit of the present invention provides three speeds in forward drive and a drive in reverse. The novel change-speed drive mechanism C is adapted to provide the underdrive low and intermediate speed forward drives and the reverse speed drive, while the magnetic clutch A is arranged to provide the direct-drive through the drive mechanism C free of interference from the underdrive speeds. The magnet clutch B may be termed the "underdrive" clutch since it is operably associated with the underdrive speeds of the change-speed transmission C for transmitting drive torque thereto when energized.

From the foregoing description considered in conjunction with the drawings, it will be seen that I have provided an efficient and compact power-transmitting means of simple construction in which the operator is initially required to make a selection merely between forward and reverse drives. Having made, for example, "forward" drive selection positive two-way driving connections are selectively obtainable automatically in up or downshifting sequence between the pair of input shafts 20 and 21 and the output shaft 46 which latter shaft is, in the preferred construction, integral with input shaft 20. All upshifts and downshifts whether the latter are "forced" or "automatic," are very smooth due to the magnetic clutch action as there is no sudden change in torque during gear changes even though under wide open throttle operation. This special feature is made possible by the unique characteristics of the dual magnetic clutches A and B as they are controllable to take care of any type of shifting conditions and absorb all shock attendant thereto.

Another special advantage is provided by the present automatic drive in the elimination of free-wheeling drive. All of the drives are of the positive two-way type which enable use of the engine compression effect for braking purposes for added safety in vehicular control, particularly in the use of the underdrive speeds on long downgrades, and to reduce brake maintenance.

*Modified reverse drive gear set and operation*

In this modified embodiment depicted in Figure 7, wherein parts analogous to those already described are designated by like reference characters distinguished by the addition of the letter "a" to each, only the closely associated structure of the power transmission C is shown, and it may be assumed that otherwise the structure corresponds to that of the embodiment first disclosed. The modified structure comprises a double-clutch collar 160 which replaces the gear-clutch collar 85 of the Figure 1 embodiment. Internal clutch teeth 161 and 162 are provided in the collar 160, said teeth being adapted to selectively engage the external clutch teeth 60a on the rear section of the drive sleeve 40a, and external clutch teeth 164 carried by a gear 165 rotatably mounted on the driven shaft 20a, said gear 165 being arranged for constant meshing engagement with idler gear 31a which in turn is drivingly connected at all times with countershaft gear 28a, thus providing a constant mesh gear set for establishing reverse drive when the double-clutch collar 160 is slidably moved into engagement with clutch teeth 164. An annular external channel 166 is provided in the collar 160 which is engaged by a shift fork or yoke 92a for operating the double-clutch collar 160 to its three different operating positions; namely, "Drive," "Neutral," and "Reverse." As in the case of the gear-clutch collar 85, the collar 160 would be preferably manually-operated as by a shift or selector lever having an indicator dial (not shown) mounted for convenience immediately below the steering wheel of the vehicle as is the conventional practice. By this novel arrangement of the reverse drive gear set, the gear train is constantly meshed and provides smoother engagement due to the reduced velocities of the rotating clutch teeth as against the higher velocities of the gear teeth engagement of the Figure 1 embodiment. Also constant-mesh drive mechanism is provided for all of the underdrive forward speeds including reverse for quieter change in speed and uniform shifting strokes for both double-clutch collars 64a and 160 to effect such speed changes.

*Modified magnetic clutch assembly and operation*

In this modified embodiment shown in Figures 8 and 9, the arrangement is essentially similar to that of the embodiment first described, except that a hydrodynamic torque-converter generally designated "J" is incorporated in series with the underdrive magnetic clutch B, otherwise the operation is similar to that of the first described embodiment shown in Figure 1. In this modified embodiment also corresponding parts are designated by like reference characters to those previously used distinguished, however, by the addition of the letter "*b*" to each. As shown in Figure 8, the fluid power transmitting device J is in the nature of a hydrodynamic torque-converter or fluid coupling of the kinetic type of conventional construction substantially and comprises an impeller or driving element 170 connected at 171 to the driving member or drum 18b, a rotor or driven element 172 connected at 173 to the front end of a tubular drive sleeve 174, a stator or reactive element 175 rotatably disposed on a central hub 176 supported by a member 177 which is fixed at its flanged periphery with respect to the inside of the housing 11b as by a plurality of cap bolts 178. A one-way roller brake 181 is provided between the hub 176 and a stator support member 179 secured to member 177 and adapted to accommodate rotation of the stator in one direction only to redirect or change the path of the circulating fluid whereby torque multiplication is produced in a manner well known in the transmission art. The other end of drive sleeve 174 is connected at 182 to a driving drum 184 of the magnetic clutch B, the front end of drive sleeve 21b confronting the other end of the drive sleeve 174 is connected at 186 to the driven member 19b of the magnetic clutch B and the other end of the drive sleeve 21b is flanged similarly to sleeve 21 to form the gear 24b. The drive sleeves 174 and 21b are rotatable supported on the input shaft 20b by means of bearings 187, 188, 189, and 190, and bearings at 23b support the rear portion of the drive sleeve 21b adjacent the gear 24b fast thereon, in the front end wall 14b of the transmission housing 13b, and the portion of the input shaft 20b in circular alignment with the gear 24b is supported by bearings 35b in the hollow of this gear.

Drive torque is transmitted from the engine (not shown) via flange 8b to the driving drum 18b, impeller 170, rotor 172, sleeve 174, driving drum 184, driven member 19b, drive sleeve 21b, gear 24b fast on the end of this latter sleeve through the selected low, or intermediate forward drive gear set or reverse drive gear set to the output shaft 46b thence to the driving wheels of the vehicle.

A pair of fixed collector rings 193 and 194 are mounted on opposite sides of the member 177 and suitably insulated therefrom. These rings are electrically connected as by circumferentially spaced conductor rivets 195 which also serve to secure the two rings and insulative spacer in assembled relationship on the member 177. A pair of movable contacts 196 and 197 carried in insulated casings 198 and 199 respectively secured to the driving element 170 and drum 184, repectively, are arranged to engage with the collector rings best demonstrated in Figure 9. Preloaded springs 200 and 201 act on the contacts 196 and 197 for maintaining the same in engagement with the collector rings 193 and 194 respectively, and including a fixed element 202 suitably insulated from the casings to which conductors 203 and 204 are connected, conductor 203 leading to the grounded field coil of magnetic clutch A, and conductor 204 leading to the rotating collector ring 133b whereby current is supplied from the battery to energize clutch A.

This modified drive unit advantageously provides three forward speeds and a reverse drive with the fluid torque-converter J in series with the two underdrive forward speeds and the reverse speed drive. All of these speeds are two-way positive drives, that is to say, the engine (not shown) is capable of driving the vehicle and the vehicle is capable of driving the engine as in "coasting" drive. An automotive vehicle equipped with this modified automatic drive may thus utilize the vehicle engine compression effect as a braking means in any of the forward speeds including reverse drive. Since the direct-drive is completed by energization of the magnetic clutch A which accommodates smooth shifting of the double-clutch collar 64b to its neutral position shown in Figure 4, a smooth transition is effected to and from the top or direct-drive. The gear box C is advantageously simple in design as in the case of the Figure 1 embodiment, utilizing synchro-mesh gearsets of long proven durability and efficiency for transmitting torque without loss to the driving wheels of the vehicle. It will also be noted that direct-drive, in which the drive is used most of the time, only clutch A is engaged with consequent minimum power loss. The automatic drive of Figure 8, as a whole, has a minimum number of operating parts which simplicity contributes to economy of manufacture.

Other advantages provided by the Figure 8 embodiment are the elimination of a variable-resistance device (not shown) from the electrical control circuit for gradually energizing the underdrive magnetic clutch B for smooth starting of the vehicle as by depressing the engine accelerator pedal (not shown) operatively connected to control such a device, the added torque applied through the underdrive gear trains for quicker vehicular acceleration and heavier loads, and of course, the "slip" characteristic enables bringing the vehicle to a standstill and so maintained without having to effect declutching of either magnetic clutch which in the present instance would function to release and lock-up instantly to facilitate gear changing operations only.

Further considering the synchronizer means E, the present invention contemplates utilization of this type of synchonizer in lieu of the squared tooth end contact arrangement previously described, for enabling synchronized engagement of either of the double-clutch collars 64 or 160 depicted in Figures 1 and 7 respectively, or the positive clutch teeth 60, 86 associated with the gear-clutch collar 85 shown in Figure 1. In either method of synchronism herein disclosed, improved efficiency is obtained as a result of using a force-transmitting mechanism (not shown) having three distinct stages of operations during a speed change as exemplified in my U. S. Patent No. 2,616,535 dated November 4, 1952.

*Modified low speed gearset and operation*

This modification depicted in Figure 10 is also designated by like reference characters to those previously used, distinguished, however, by the addition of the letter "*c*" to each. The arrangement is essentially similar to that of the previously described embodiments, except that the over-running clutch D is eliminated along with the synchronizing assistance derived from its momentary one-way drive lock-up, and an annular bushing 206 employed in lieu thereof, which is press-fitted in a hollow 207 of the low gear 208 to form a bearing surface with an annular end land 209 on which the low gear can rotate relatively to the drive sleeve 40c at such times that the low speed gear train is disestablished.

In operation, engagement of the double-clutch teeth 66c with the teeth 70c carried on the low gear 208 is effected solely by synchronism of the teeth aforesaid while the tooth ends rub against each other influenced by a shift-inducing force acting on the double-clutch member 64c. Due to the squared end contour of the teeth and controlled engaging tolerances therebetween, the teeth are held out of engagement until such time as the mating teeth are in substantial synchronism whereupon shockless and quiet engagement ensues as previously described in connection with the Figure 1 embodiment.

The synchronizer means E shown in Figure 1 may be effectively employed in lieu of the abutting tooth method of synchronism in the present modification, but the added cost with no appreciable improvement in operational results favors use of the more simple tooth abutting type in conjunction with control means hereinbefore mentioned.

OPERATIONAL SUMMARY

From the foregoing description, taken in conjuction with the various illustrations of the different embodiments of my invention, it will be seen that certain interrelated components of the present automatic drive possess similar functional characteristics, such that interchangeability is readily effected, particularly in connection with the synchronizing features. For example, the abutting-tooth method and/or overrunning clutch D, or the friction-type synchronizer E may be effectively controlled with equal efficiency by manual or power force transmitted through force-transmitting connections disclosed in my Patent No. 2,616,535 granted November 4, 1952. Thus, the shiftable members 64 and 85 or modifications thereof may utilize either of the above methods of synchronization to enable smooth engagement of the clutch teeth carried thereby with their respective complemental clutch teeth carried by gears 38, 53, and composite drive sleeve 40 or modifications thereof, however, the two first-mentioned methods may be employed separately or supplementally since the overrunning clutch D can effect complete synchronization of the associated positively engageable relatively movable clutch elements when one-way drive is momentarily established thereby enabling instant conversion to two-way driving relation between the clutch elements as is understood.

It is thus seen that the aforesaid methods of synchronization of the present construction afford desirable results by providing selective methods according to the ratio drives. Further beneficial results in the driving control of a motor vehicle equipped with my automatic power transmission may also be realized in the selective use of either pneumatic, hydraulic or vacuum as the actuating force for the servo-mechanism F to shift the shiftable elements 64 and 85 or modifications thereof, and the incorporation of the torque-converter or fluid-coupling J, as desired, in the underdrive power train to facilitate smooth starting of the vehicle and to provide additional power and acceleration according to vehicular performance desired. Moreover, the present invention contemplates that engagement of the positive clutch teeth will be effected quietly and rapidly in establishing the selected speed drive, and that such engagement will be influenced by accelerator position and vehicular speed to provide "open" throttle shifts for uninterrupted acceleration.

And, a further highly advantageous feature of the present invention where a torque-converter and/or fluid-coupling is used in the drive line, is provided by utilizing such a fluid-drive in the underdrive power trains only so that the economical use of a "non-slip" direct drive over the widest possible driving range of the vehicle is made available, and that the direct-drive be of the mechanical-type free of interference from the underdrive power trains and the fluid-drive operably in series therewith. Thus, the power transmission of Figures 8 and 9 demonstrates a most practical adaptation of a fluid-drive whereby smooth starting of the vehicle in either direction is effected under all driving or load conditions without special driver cautions and control manipulations, and while cruising, the fluid-drive is automatically and completely disabled as a torque-transmitting medium by engagement of the direct-drive which transmits the drive torque from the engine (not shown) directly to the vehicle driving wheels without power loss thus enabling use of lower engine displacements without sacrificing performance.

The magnetic clutches A and B normally contain a suitable quantity of fluid magnetic material in chambers 105, 106. This material when energized by coils 112, takes up a position in the air gaps 114 through the establishing of a magnetic circuit having a flux path into which the peripheral portion of the driven members 19 project. When the magnetic circuit has been established, the driven member 19 is attracted by the driving member 18 such that the magnetic lines of force are disposed substantially normal to the confronting surfaces on the peripheral portion thereof in frictional engaging relationship therewith, said confronting surfaces being separated solely by the layer of magnetic material drawn therebetween and operative as a bonding and power transmitting medium for the effective transmission of torque between the driving and driven members as is understood. Simultaneously therewith, the magnetic material as it assumes its position in the air gap 114, it forms through the action of the magnetic lines of force between the driving and driven members 18, 19, substantially solid links or chains serving to transmit torque between said members.

As a result of the transmission of torque between the drum 18 and driven member 19, a maximum amount of torque transmission is available for a given size and space.

Considering the terminology used in the foregoing description and in the appended claims, the identifying expressions and/or terms employed are intended to convey meanings which include the range of reasonable equivalents in the patent sense. For example, "automatic drive," "automatic transmisison," "power train," "power transmission," "change-speed transmission," "transmission," "variable-ratio transmission," are intended to include the illustrated coupling means and associated synchromesh drive mechanism or gearbox, whether the coupling means include a fluid-torque transmitting connection, a master clutch, a magnetic clutch, a friction clutch, or any combination of these components, while the drive mechanism may comprise either sliding or planetary gearing or both in combination to produce the mechanical gearing, gear sets or trains or some other selective drive mechanism serving the same purpose. The terms "front," "forward," "rear," "bottom," "rightward," and other directional words or characters except those referring to the direction of motion of the vehicle, are intended to have only relative connotation for convenience in describing the structure as illustrated, and are not intended to be interpreted as requiring any particular orientation with respect to associated structure external to the present disclosure.

Although it will be apparent that the preferred embodiments of my invention herein disclosed are well calculated to fulfill the objects above stated, it will be appreciated that I do not wish such to be limited to the exact construction and/or arrangement of parts shown, since it is evident that modifications, variations, changes, and substitutions may be made therein without departing from the proper scope or fair meaning of the subjoined claims.

Having thus described my invention, I claim:

1. In change-speed transmisisons, a source of driving torque, a pair of coaxial driving shafts, a pair of clutches for selectively connecting said shafts to said source of torque, a driving sleeve loosely mounted on one of the driving shafts a countershaft, a pair of gear trains for selectively connecting said shafts, including a gear fast on the countershaft in constant mesh with a smaller gear fixed on the other driving shaft, another gear fast on the countershaft constantly meshing with a gear loosely mounted on the one driving shaft, a third gear fast on the countershaft constantly meshing with a larger gear loosely mounted on the driving sleeve, positive clutch means slidably splined on the one driving shaft for connecting the driving sleeve thereto, another positive clutch means slidably splined on the driving sleeve coaxial operating relationship with respect to the larger gear and the first-mentioned loosely mounted gear for selectively connecting them to the driving sleeve, and overrunning clutch means operably incorporated between the larger gear and driving sleeve for momentarily establishing a one-way drive synchronism therebetween to facilitate connection aforesaid of the last-named positive clutch means without interrupting the meshing relation of the larger gear and mating countershaft gear.

2. A change-speed transmission according to claim 1 in which the other coaxial shaft comprises a sleeve encircling a portion of the one coaxial shaft.

3. A change-speed transmission according to claim 2 in which the pairs of clutches comprise: separate magnetically engageable driving and driven members, a field coil carried by each clutch, and a source of electrical current to selectively energize the field coils to establish separate magnetic fields within said clutches to engage the same to transmit driving torque from the first-mentioned source to their respective driving shafts.

4. A change-speed transmission according to claim 2 including a hydrodynamic torque-converter operatively interposed in the other coaxial driving shaft in series with the clutch for driving the same.

5. Torque-changing mechanism including a source of driving torque, a pair of coaxial driving shafts, a pair of clutches for selectively connecting said shafts to said source of torque, a countershaft parallelly disposed with respect to said driving shafts, selectively engageable elements providing two torque-transmitting two-way drive connections between said shafts including a third two-way drive connection provided by one of the pair of clutches and driving shafts connected directly thereto, said torque-transmitting connections including a driving sleeve having clutch elements loosely mounted on the one driving shaft, a gear loosely mounted on the driving sleeve having an integral toothed portion in surrounding relation thereto, overrunning clutch synchronizing means operably incorporated between the driving sleeve and toothed portion of said gear, a gear fast on the countershaft constantly meshing with said toothed portion of said first-named gear, a second gear fast on the countershaft, a gear loosely mounted on the one driving shaft constantly meshing with the last-named gear, a third gear fast on the countershaft, a gear fixed on the other driving shaft constantly meshing with the third gear on the countershaft for driving the latter, positive clutch means including an element slidably splined on the one driving shaft having clutch elements for engaging the clutch elements on the driving sleeve to connect the latter to the one driving shaft, positive double-clutch means having an element slidably splined on the driving sleeve in coaxial operating relationship with respect to the overrunning clutch means for selectively engaging complemental clutch elements on the two gears loosely mounted on the one driving shaft and driving sleeve, respectively, to render the two first-mentioned drive connections selectively effective to transmit torque in two-way driving relation, means effective to selectively engage the pair of clutches to render the third drive connection effective to transmit torque in two-way driving relation and to transmit driving torque to the two first-mentioned drive connections, respectively, and means operable for sliding the element of the first-mentioned positive clutch means, and means operable for sliding the element of the positive double-clutch means.

6. Torque-changing mechanism according to claim 5 in which the driving sleeve comprises two sections medially interlocked for rotation together, with the clutch elements aforesaid on one of the sections and the double-clutch element slidably splined on the other section.

7. Torque-changing mechanism according to claim 6 in which the other coaxial shaft comprises a sleeve encircling a portion of the one coaxial shaft.

8. Torque-changing mechanism according to claim 7 in which the pair of clutches comprise: separate magnetically engageable driving and driven members, a field coil for each, and a source of electric current for selectively energizing the field coils to establish separate magnetic fields within said clutches engage the driving and driven members thereof to transmit driving torque from the first-mentioned source to their respective driving shafts.

9. Torque-changing mechanism according to claim 8 including a fourth gear fast on the countershaft, a fixed shaft parallel to the countershaft, an idler gear loosely mounted on said fixed shaft in constant mesh with the fourth gear, and a peripheral toothed portion integral with the element of the first-mentioned positive clutch means for selective meshing engagement with the teeth on the idler gear for producing a reverse two-way drive connection.

10. Torque-changing mechanism according to claim 9 in which the element of the first-mentioned positive clutch means is adapted to slidably assume a neutral disengaged position with respect to the clutch elements on the one section of the driving sleeve and the teeth on the idler gear whereby the two first-mentioned drive connections are rendered ineffective to transmit driving torque notwithstanding the positive double-clutch element is engaged to one or the other of said connections.

11. Torque-changing mechanism according to claim 10 including a hydrodynamic torque-converter operatively interposed in the other coaxial driving shaft between the magnetic clutch for driving the same and the gear fixed thereon.

12. In change-speed transmissions, the combination of a drive shaft, a driven shaft, a countershaft, a driven sleeve rotatably mounted on the driven shaft and having clutch elements, a positive clutch element slidably splined on the driven shaft for engaging the clutch elements on the driven sleeve for connecting the latter to the driven shaft, a gear rotatably mounted on the driven sleeve, a gear fast on the countershaft in constant meshing relation with the first-named gear, a gear rotatably mounted with respect to the driven shaft and sleeve, a second gear fast on the counter shaft in constant meshing relation with the last-named gear, a positive double-clutch element slidably splined on the driven sleeve for selectively connecting the rotatable gears aforesaid to the driven sleeve, a third gear fast on the countershaft, and a gear fixed on the drive shaft in constant meshing relation with the last-named gear for driving the countershaft.

13. In change-speed transmissions according to claim 12 including in combination a fourth gear fast on the countershaft, a fixed shaft parallel to the countershaft, an idler gear rotatably mounted on said fixed shaft in constant meshing relation with the fourth gear, and a gear-toothed portion forming the periphery of the first-mentioned positive clutch element for selective engagement with the teeth on the idler gear.

14. In change-speed transmissions according to claim 12 including in combination a fourth gear on the countershaft, a fixed shaft, an idler gear rotatably mounted on the fixed shaft in constant meshing relation with the fourth gear, a second gear rotatably mounted with respect to the driven shaft in constant meshing relation with the idler gear, clutch elements integral with the second gear rotatable with respect to the driven shaft, and complemental clutch elements carried by the first-mentioned positive clutch element for selective engagement with the clutch elements integral with the last-mentioned rotatable gear.

15. In change-speed transmissions according to claim 12 including in combination friction synchronizer means having a movable element influenced by the positive double-clutch element and operatively associated with the positively engaging clutch elements of one of the rotatably mounted gear for establishing synchronous speeds therebetween to facilitate engagement of said positive elements.

16. In torque-transmitting mechanism having a source of drive torque production: three drive shafts; a pair of clutches having engageable driving and driven members, the driven member of one of said clutches being connected to one of the drive shafts, and the driven member of the other clutch being connected to one of the two remaining drive shafts; and fluid-torque transmitting means operably connected to the driving member of the said one clutch and comprising a driving element connected to the source of drive torque, a driven element connected via the other of the two remaining drive shafts to the driving member of the other clutch, a rotatable reactive element, a fixed element on which the reactive element rotates, and a one-way brake operably incorporated between the fixed and reactive elements for enabling the latter to rotate in one direction only.

17. In torque-transmitting mechanism having a source of drive torque production: a driving shaft; a pair of coaxially disposed driving sleeves encircling the driving shaft; a pair of energizable magnetic iron-powder clutches, each having a driving member and a driven member, separate field coils carried by each of the driving members, and electrical conductors including a source of electrical energy connected to the coils for energizing the same to solidify the iron-powder to lock the driving and driven members for simultaneous rotation, the driven members of said clutches being connected to the driving shaft and one of the driving sleeves, respectively; and fluid-torque transmitting means drivingly connected to the driving member of the clutch connected to the driving shaft and comprising a driving element connected to the source of drive torque, a driven element connected via the other driving sleeve to the one driving member of the clutch connected to the driving sleeve, a rotatable reactive element, a fixed element on which the reactive element rotates; and a one-way roller brake operably incorporated between the fixed and reactive elements for enabling the latter to rotate in one direction only.

18. In torque-transmitting mechanism having a source of drive torque production: a drive sleeve; a pair of driving shafts; a pair of clutches having co-rotatable driving and driven members, respectively, the driven member of one of said clutches being connected to one of the driving shafts, and the driven member of the other clutch being connected to the other of said driving shafts; and fluid-torque transmitting means drivingly connected to the driving member of one clutch and comprising a driving element connected to the source of drive torque, and a driven element connected via the drive sleeve to the driving member of the other clutch.

19. In torque-transmitting mechanism having a source of drive torque production: a driving shaft; a pair of coaxially disposed driving sleeves encircling the driving shaft; a pair of slectively energizable magnetic iron-powder clutches, each having a driving member and a driven member, separate field coils carried by each of the driving members, and electrical conductors including a source of electrical energy connected to the coils for energizing the same to solidify the iron-powder to lock the driving and driven members for simultaneous rotation, the driven members of said clutches being connected to the driving shaft and one of the driving sleeves, respectively; and fluid-torque transmitting means drivingly connected to the driving member of the clutch connected to the driving shaft and comprising a driving element connected to the source of drive torque, and a driven element connected via the other driving sleeve to the one driving member of the clutch connected to the driving sleeve.

20. A torque-transmitting mechanism for automotive vehicles including a torque producing internal-combustion engine, a change-speed power train having a pair of coaxially disposed drive shafts with one of the shafts encircling the other, a countershaft disposed parallelly with respect to said drive shafts, a pair of clutches having engageable driving and driven members with their respective driving members connected to the engine and their driven members connected to said drive shafts, a plurality of gearsets between said shafts, a pair of double-engageable elements slidable relatively to said gearsets for engagement therewith, the selective engagement of said clutches and slidable elements establishes three forward positive drive trains of different transmitting ratios, and operatable linkage mechanism adapted to slide the pair of double elements: fluid and spring-pressure responsive servo-mechanism including a pair of movable power members operatively connected to operate the linkage mechanism in part for sliding one of the double elements; a source of pressure different from atmosphere for operatively energizing the movable power members in one direction; manually-operable selector mechanism including a member operatively connected to other portions of the linkage mechanism for sliding the other double element to two different positions, one of which corresponds to neutral while the other position is common to all three of the drive trains; said gearsets comprising a gear fast on the drive shaft encircling the other drive shaft, a first gear fast on the countershaft in constant meshing relation with the gear fast on the encircling drive shaft for driving the countershaft, a second gear fast on the countershaft, a gear rotatably mounted on the other drive shaft in constant meshing relation with the last-mentioned gear, a composite drive sleeve rotatably mounted on the other drive shaft and having two sections with their confronting ends interlocked for simultaneous rotation, a third gear fast on the countershaft, a gear rotatably mounted on one of the drive sleeve sections, a collar fixed to the outer end of the other drive sleeve section and having its peripheral surface longitudinally splined on which the servo-shifted double-engageable element slides, clutch elements carried by the servo-shifted double element on opposite ends thereof, complemental clutch elements carried by the gear rotatably mounted on the other drive shaft and selectively engageable therewith by the opposed clutch elements on the servo-shifted double element to establish intermediate and low speed drive trains, respectively, clutch elements carried on one end of the manually-shifted double element, complemental clutch elements carried on the outer end of the one drive sleeve section and engageable by the clutch elements on the manually-shifted double element to lock the drive sleeve to the other drive shaft to condition the low and intermediate speed drive trains for effectual transfer of drive torque, and an overrunning clutch having a series of graduated roller sets operably disposed between the one drive sleeve section and gear rotatable thereon for effecting momentary one-way drive synchronism therebetween to facilitate their positive lock-up; and direct-drive train is established by the first-mentioned clutch connected to the other drive shaft when engaged and the other of the first-mentioned pair of clutches connected to the encircling drive shaft disengaged.

21. The torque-transmitting mechanism according to claim 20 in which each of the pair of double-engageable elements includes an external annular groove.

22. The torque-transmitting mechanism according to claim 21 in which the operatable linkage mechanism includes a pair of shifting forks adapted to project into said annular grooves to impart shifting movement thereto.

23. The torque-transmitting mechanism according to claim 22 including friction synchronizing mechanism operably associated with the intermediate speed drive train and comprising: an annular hub on the gear rotatably mounted on the other drive shaft and having a tapered external surface, a movable annular ring having an internal complemental tapered surface adapted to frictionally engage the tapered surface on the hub, a plurality of circumferentially spaced longitudinally disposed slots in the fixed collar aforesaid, movable detent elements disposed in said slots for radial and longitudinal movements, a pair of preloaded circular expansible springs carried on opposite sides of the fixed collar and engaging the inner sides of the detents to radially displace the same and accommodate longitudinal movement thereof, transverse ridges on the outer surface of the detents, and an internal annular groove in the inner splined surface of the servo-shifted double-engageable element normally adapted to receive said transverse ridges whereby initial sliding movement of the servo-shifted double-engageable element is effective to releasably engage the confronting ends of the detents with the annular ring to bring the latter into frictional engagement with the hub tapered surface to establish substantially synchronous speeds between gear rotatably mounted on the other drive shaft and servo-shifted double-engageable element to facilitate subsequent engagement of the positive clutch elements of the servo-shifted double element and gear rotatably mounted on the other drive shaft, whereupon the detents are released automatically from the internal annular groove to interrupt the frictional engagement aforesaid.

24. The torque-transmitting mechanism according to claim 20 including a fourth gear fast on the countershaft, a fixed shaft, and an idler gear rotatably mounted on the fixed shaft and constantly meshing with the last-mentioned gear, the idler gear having gear teeth adapted for meshing engagement with complemental peripheral gear teeth on the double element operated by the selector mechanism to establish a reverse drive train, and a third position setting for the selector mechanism effective to accommodate operation of the latter to effect sliding engagement of the double element.

25. The torque-transmitting mechanism according to claim 20 including a fourth gear fast on the countershaft, a fixed shaft, and an idler gear rotatably mounted on the fixed shaft and constantly meshing with the last-mentioned gear, another gear rotatably mounted on the one drive shaft and constantly meshing with the idler gear, complemental clutch elements carried by the other gear for engaging different clutch elements carried by the double element operated by the selector mechanism to establish a reverse drive train, and a third position setting for the selector mechanism effective to accommodate operation of the latter to effect sliding engagement of the double element.

26. A torque-transmitting mechanism according to claim 20 including a drive sleeve, fluid-torque transmitting means drivingly connected to the driving member of the clutch connected to the drive shaft encircled by the other shaft and comprising a driving element connected to the engine, a driven element connected via said drive sleeve to the driving member of the clutch connected to said encircling shaft, a rotatable reactive element, a fixed element on which the reactive element rotates, and a one-way roller brake operably incorporated between the fixed and reactive elements for enabling the latter to rotate in one direction only.

27. The torque-transmitting mechanism according to claim 26 in which each of the pair of double-engageable elements includes an external annular groove.

28. The torque-transmitting mechanism according to claim 27 in which the operatable linkage mechanism includes a pair of shifting forks projecting into said annular grooves to impart shifting movement thereto.

29. The torque-transmitting mechanism according to claim 28 including friction synchronizing mechanism operably associated with the intermediate speed drive train and comprising: an annular hub on the gear rotatably mounted on the other drive shaft and having a tapered external surface, a movable annular ring having an internal complemental tapered surface adapted to frictionally engage the tapered surface on the hub, a plurality of circumferentially spaced longitudinally disposed slots in the fixed collar aforesaid, movable detent elements disposed in said slots for radial and longitudinal movements, a pair of preloaded circular expansible springs carried on opposite sides of the fixed collar and engaging the inner sides of the detents to radially displace the same and accommodate longitudinal movement thereof, transverse ridges on the outer surface of the detents, and an internal annular groove in the inner splined surface of the servo-shifted double-engageable element normally receiving said transverse ridges whereby initial sliding movement of the servo-shifted double-engageable element is effective to releasably engage the confronting ends of the detents with the annular ring to bring the latter into frictional engagement with the hub tapered surface to establish substantially synchronous speeds between gear rotatably mounted on the other drive shaft and servo-shifted double-engageable element to facilitate subsequent engagement of the positive clutch elements of the servo-shifted double element and gear rotatably mounted on the other drive shaft, whereupon the detents are released automatically from the internal annular groove to interrupt the frictional engagement aforesaid.

30. The torque-transmitting mechanism according to claim 26 including a fourth gear fast on the countershaft, a fixed shaft, and an idler gear rotatably mounted on the fixed shaft and constantly meshing with the last-mentioned gear, the idler gear having gear teeth adapted for meshing engagement with complemental peripheral gear teeth on the double element operated by the selector mechanism to establish a reverse drive train, and a third position setting for the selector mechanism effective to accommodate operation of the latter to effect sliding engagement of the double element.

31. The torque-transmitting mechanism according to claim 26 including a fourth gear fast on the countershaft, a fixed shaft, and an idler gear rotatably mounted on the fixed shaft and constantly meshing with the last-mentioned gear, another gear rotatably mounted on the one drive shaft and constantly meshing with the idler gear, complemental clutch elements carried by the other gear for engaging different clutch elements carried by the double element operated by the selector mechanism to establish a reverse drive train, and a third position setting for the selector mechanism effective to accommodate operation of the latter to effect sliding engagement of the double element.

32. In change-speed transmissions, a source of driving torque, a pair of coaxial driving shafts, a pair of clutches for selectively connecting said shafts to said source of torque, a driving sleeve loosely mounted on one of the driving shafts, a countershaft, a pair of gear trains for selectively connecting said shafts, including a gear fast on the countershaft in constant mesh with a smaller gear fixed on the other driving shaft, another gear fast on the countershaft constantly meshing with a gear loosely mounted on the one driving shaft, a third gear fast on the countershaft constantly meshing with a larger gear loosely mounted on the driving sleeve, positive clutch means slidably splined on the one driving shaft for connecting the driving sleeve thereto, and another positive clutch means slidably splined on the driving sleeve in coaxial operating relationship with respect to the larger gear and the first-mentioned loosely mounted gear for selectively connecting them to the driving sleeve in two-way driving relation.

33. A change-speed transmission according to claim 32 in which the other coaxial shaft comprises a pair of sleeves encircling a portion of the one coaxial shaft.

34. A change-speed transmission according to claim 33 in which the pair of clutches comprise: separate magnetically engageable driving and driven members, a field coil and a source of electrical current to selectively energize the field coils to establish separate magnetic fields within said clutches to engage the same to transmit driving torque from the source to their respective driving shaft and one of the encircling sleeves.

35. A change-speed transmission according to claim 34 including a hydrodynamic torque-converter drivingly connected to the magnetic clutch connected to the encircled driving shaft for transmitting drive torque via the other encircling sleeve to the driving member of the magnetic clutch connected to the one encircling sleeve.

References Cited in the file of this patent

UNITED STATES PATENTS

| | | | |
|---|---|---|---|
| 1,886,003 | Garrison | Nov. 1, | 1932 |
| 1,901,283 | Burtnett | Mar. 14, | 1933 |
| 1,902,618 | Burtnett | Mar. 21, | 1933 |
| 1,950,110 | Hartsock | Mar. 6, | 1934 |
| 1,950,844 | Forster | Mar. 13, | 1934 |
| 2,021,165 | Barton | Nov. 19, | 1935 |
| 2,193,267 | Burtnett | Mar. 12, | 1940 |
| 2,606,461 | Herndon | Aug. 12, | 1952 |

UNITED STATES PATENT OFFICE

CERTIFICATE OF CORRECTION

Patent No. 2,870,642                                           January 27, 1959

Glenn T. Randol

It is hereby certified that error appears in the printed specification of the above numbered patent requiring correction and that the said Letters Patent should read as corrected below.

Column 3, line 40, for "pressure" read -- pressures --; column 5, line 26, for "grooved" read -- groove --; line 32, for "external" read -- externally --; column 8, line 41, for "cause" read -- causes --; column 10, line 38, for "enable" read -- enables --; line 46, after "distinguished" insert -- , however, --; column 13, line 69, for "operably" read -- operable --; column 14, line 67, after "shafts" insert a comma; column 15, line 2, after "sleeve" insert -- in --; column 17, line 54, for "slectively" read -- selectively --.

Signed and sealed this 29th day of March 1960.

(SEAL)
Attest:

KARL H. AXLINE                                       ROBERT C. WATSON
Attesting Officer                                    Commissioner of Patents